US012650729B2

(12) United States Patent
Kwak

(10) Patent No.: US 12,650,729 B2
(45) Date of Patent: Jun. 9, 2026

(54) DISPLAY DEVICE

(71) Applicant: LG Display Co., Ltd., Seoul (KR)

(72) Inventor: Bongchoon Kwak, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/745,468

(22) Filed: Jun. 17, 2024

(65) Prior Publication Data

US 2025/0238077 A1      Jul. 24, 2025

(30) Foreign Application Priority Data

Jan. 24, 2024      (KR) ........................ 10-2024-0010820

(51) Int. Cl.
*G06F 3/01*          (2006.01)
*G09G 3/3275*      (2016.01)
*G02B 27/01*        (2006.01)

(52) U.S. Cl.
CPC ........... *G06F 3/013* (2013.01); *G09G 3/3275* (2013.01); *G02B 27/01* (2013.01); *G06F 3/011* (2013.01); *G06F 3/012* (2013.01); *G09G 2310/08* (2013.01); *G09G 2340/04* (2013.01)

(58) Field of Classification Search
CPC ......... G06F 3/011; G06F 3/012; G06F 3/013; G09G 3/3275; G09G 2310/08; G09G 2340/04; G02B 27/01
USPC ...................................................... 345/156
See application file for complete search history.

(56) References Cited

U.S. PATENT DOCUMENTS

| | | | |
|---|---|---|---|
| 11,663,980 B2 | 5/2023 | Shin et al. | |
| 2012/0154277 A1* | 6/2012 | Bar-Zeev | G02B 27/017 |
| | | | 345/158 |
| 2014/0118240 A1* | 5/2014 | Pais | G09G 3/00 |
| | | | 345/698 |
| 2014/0168054 A1* | 6/2014 | Yang | G06F 3/013 |
| | | | 345/156 |
| 2018/0095531 A1* | 4/2018 | Brown | H04N 21/47 |
| 2018/0224935 A1* | 8/2018 | Thunström | G06F 3/013 |
| 2018/0284954 A1* | 10/2018 | Alcorn | G06F 3/0482 |
| 2018/0366068 A1* | 12/2018 | Liu | G06V 40/171 |
| 2021/0203856 A1* | 7/2021 | Hirose | H04N 23/611 |
| 2022/0383824 A1* | 12/2022 | Shin | G06F 3/147 |

FOREIGN PATENT DOCUMENTS

KR      10-2022-0160800 A      12/2022

* cited by examiner

*Primary Examiner* — Tom V Sheng
(74) *Attorney, Agent, or Firm* — Fenwick & West LLP

(57) ABSTRACT

A display device includes: a display panel; a controller configured to estimate a focal region faced by a user's gaze, and process a resolution of input image data in a neighboring region neighboring to the focal region to be lower than a resolution of the focal region; and a display driver configured to distinguish the focal region and the neighboring region on a screen of the display panel, and a shape of the focal region may be varied according to a focal location corresponding to the user's gaze.

12 Claims, 10 Drawing Sheets

Center of HMD
F'(a, b, c)

Center of HMD
O'(0, 0, d)

F'(a, b, c)

ℓminor

O'(0, 0, d)

DISPLAY DEVICE

CROSS-REFERENCE TO RELATED APPLICATION

This application claims the priority of Republic of Korea Patent Application No. 10-2024-0010820 filed on Jan. 24, 2024, which is hereby incorporated by reference in its entirety.

BACKGROUND

Field

The present disclosure relates to a display device.

Description of the Related Art

Virtual reality technology is developing most rapidly in defense, architecture, tourism, films, multimedia and game fields. Virtual reality refers to specific environment and situation, which are similar to the actual environment using three-dimensional image technology. Devices for realizing the virtual reality technology may be divided into a virtual reality (VR) device or an augmented reality (AR) device. The devices are developed as a structure of various forms of display devices, such as head mounted display (HMD), face mounted display (FMD), eye glasses-type display (EGD), etc.

SUMMARY

The present disclosure has been made in an effort to provide a display device which improves an image quality by minimizing or at least reducing a delay time up to calculating a shape of a focal region.

Objects of the present disclosure are not limited to the above-mentioned objects, and other objects, which are not mentioned above, can be clearly understood by those skilled in the art from the following descriptions.

In order to achieve the problem, a display device according to an embodiment of the present disclosure may include: a display panel; a controller configured to estimate a focal region faced by a user's gaze, and process a resolution of input image data in a neighboring region neighboring to the focal region to be less than a resolution of the focal region; and a display driver configured to distinguish the focal region and the neighboring region on a screen of the display panel, and a shape of the focal region may be varied according to a focal location corresponding to the user's gaze.

A display device according to an embodiment of the present disclosure may include: a display panel configured to display an image; an optical lens configured to distort the image and transfer the distorted image to naked eyes of a user; a controller configured to determine a shape of a focal region based on a focal location of the user; and a memory including a look up table that stores shapes of a plurality of predetermined focal regions to correspond to different focal locations, and the controller may be further configured to select a shape of a predetermined focal region of the plurality of predetermined focal regions from the look up table based on the focal location of the user.

Other detailed matters of the embodiments are included in the detailed description and the drawings.

According to an embodiment of the present disclosure, a display device which recognizes a focal location depending on a user's gaze and previously sets a shape of a focal region for each focal location to reduce a time for calculating the shape of the focal region.

The effects of the present disclosure are not limited to the aforementioned effects, and other effects, which are not mentioned above, will be apparently understood to a person having ordinary skill in the art from the following description.

The objects to be achieved by the present disclosure, the means for achieving the objects, and the effects of the present disclosure described above do not specify essential features of the claims, and, thus, the scope of the claims is not limited to the disclosure of the present disclosure.

The effects according to the present disclosure are not limited to the contents exemplified above, and more various effects are included in the present specification.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
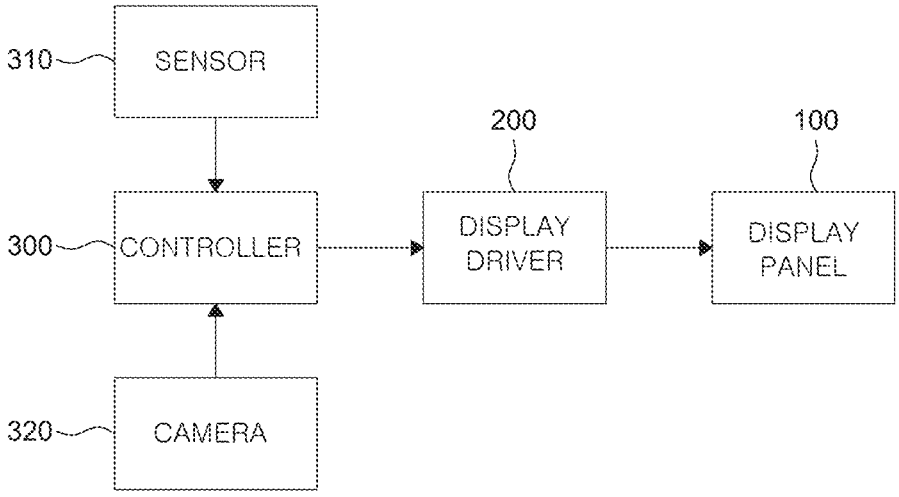
FIG. 1 is a block diagram schematically illustrating a display device according to an embodiment of the present disclosure.

Advantages and characteristics of the present disclosure and a method of achieving the advantages and characteristics will be clear by referring to embodiments described below in detail together with the accompanying drawings. However, the present disclosure is not limited to the embodiments disclosed herein but will be implemented in various forms. The embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements through-out the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for configured to distinguish one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or com-bined with each other and can be interlocked and operated in technically various ways, and the embodiments can be carried out independently of or in association with each other.

Hereinafter, a display device according to embodiments of the present disclosure will be described in detail with reference to accompanying drawings.

A transistor used in a display device according to embodi-ments of the present disclosure may be implemented as any one transistor of an n-channel transistor (NMOS) and a p-channel transistor (PMOS). The transistor may be imple-mented as an oxide semiconductor transistor having an oxide semiconductor as an active layer or an low tempera-ture poly-silicon (LTPS) transistor having LTPS as the active layer. The transistor may at least include a gate electrode, a source electrode, and a drain electrode. The transistor may be implemented as a thin film transistor (TFT) on a display panel. A carrier in the transistor flows from a source elec-trode to a drain electrode. In the case of the n-channel transistor (NMOS), since the carrier is an electron, a source voltage may be lower than a drain voltage so that the electron may flow from the source electrode to the drain electrode. In the n-channel transistor (NMOS), a current may flow from the drain electrode to the source electrode, and the source electrode may be an output terminal. In the case of the p-channel transistor (PMOS), since the carrier is a hole, the source voltage may be higher than the drain voltage so that the hole may flow from the source electrode to the drain electrode. Since the hole flows from the source electrode to the drain electrode in the p-channel transistor (PMOS), the current may flow from a source to a drain, and the drain electrode may be the output terminal. Accordingly, it should be noted that since the source and the drain may be changed according to an applied voltage, the source and the drain of the transistor are not fixed. In the present disclosure, a description is made by assuming that the transistor is the n-channel transistor (NMOS), but the present disclosure is not limited thereto, but the p-channel transistor may be used, and as a result, a circuit configuration may also be changed.

A gate signal of the transistor used as switch elements may swing between a gate on voltage and a gate off voltage. The gate on voltage may be set to a voltage higher than a threshold voltage Vth of the transistor, and the gate off voltage may be set to a voltage lower than the threshold voltage Vth of the transistor. The transistor is turned on in response to the gate on voltage, while turned off in response to the gate off voltage. In the case of the n-channel transistor (NMOS), the gate on voltage may be a gate high voltage (VGH), and the gate off voltage may be a gate low voltage (VGL). In the case of the p-channel transistor (PMOS), the gate on voltage may be the gate low voltage (VGL), and the gate off voltage may be the gate high voltage (VGH).

Hereinafter, various embodiments of the present disclo-sure will be described in detail with reference to the accom-panying drawings.

Figure 2:
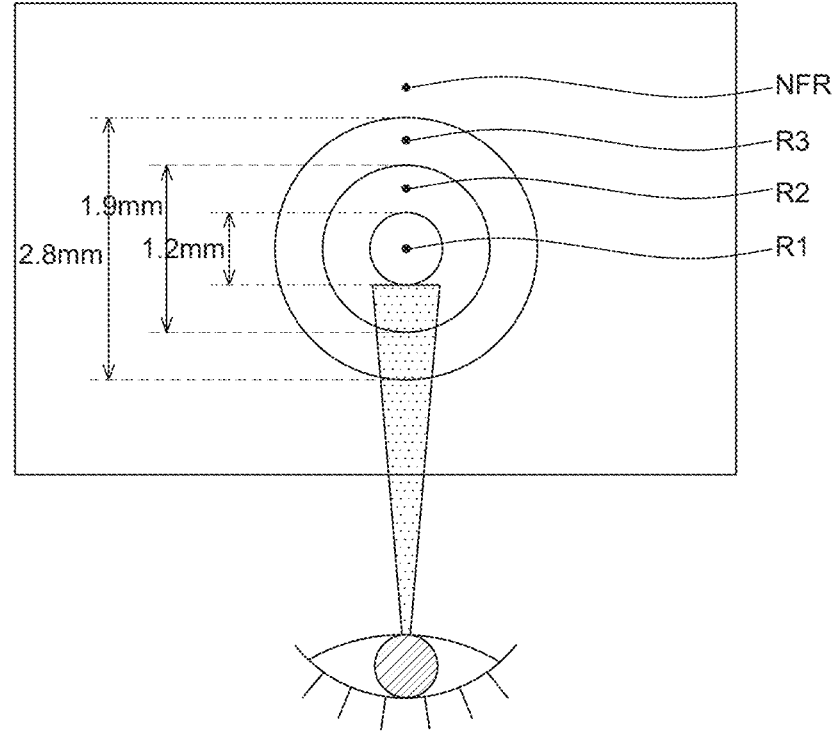
FIG. 2 is a diagram illustrating a focal region on a screen according to an embodiment of the present disclosure.

FIG. 1 is a block diagram schematically illustrating a display device according to an embodiment of the present disclosure, and FIG. 2 is a diagram illustrating a focal region on a screen according to an embodiment of the present disclosure.

Referring to FIGS. 1 and 2, the display apparatus of the present disclosure includes a display panel 100, a controller 300, and/or a display driver 200.

The controller 300 may include main circuit boards of a television (TV) system, a computer system, a set-top box, a navigation system, a mobile terminal system, a wearable system, a virtual/augmented reality system (hereinafter, referred to as "VR/AR system"). Hereinafter, the controller 300 is described based on the virtual reality device system, but it should be noted that the controller 300 is not limited thereto.

The controller 300 is connected to a sensor 310, a camera 320, etc. The controller 300 further includes an external device interface connected to a memory or an external video source, a user interface receiving a user command, a power supply generating power, etc. The external device interface, the user interface, the power supply, etc., are omitted in drawings. The controller 300 controls resolutions of a focal region and a non-focal region by using a graphic image processing unit such as a graphic processing unit (GPU) that performs image processing of an input image. The external device interface may be implemented as various known interface modules including Universal serial bus (USB), High-definition multimedia interface (HDMI), etc.

The controller 300 transmits, to the display driver 200, pixel data of an input image and a timing signal synchro-nized therewith. The controller 300 analyzes image data from the camera 320 that captures a left eye and a right eye of a user with a predetermined eye tracking algorithm to estimate a focal region faced by the left eye and the right eye of the user. The controller 300 controls the resolution of the input image in the focal region and the non-focal region outside the focal region by using a foveated rendering algorithm. The controller 300 converts a pixel data resolu-tion of the input image according to the resolutions of the focal region and the non-focal region by using a scaler.

In the case of a VR/AR system, since a distance between the eye of the user and a screen AA of the display panel 100 is very short, a high resolution of 4 K or more is required.

The foveated rendering algorithm may increase a resolution of pixel data corresponding to the focal region displayed in the display panel 100 by using location information of a pupil, and reduce a transmitted data amount and the number of transitions by repeatedly configuring the same data in units of a predetermined pixel block in the non-focal region other than the focal region. The foveated rendering algorithm may reduce a data amount transmitted to the display driver 200 by 80% or more by encoding pixel data to be written in pixels of the focal region with a representative value.

The controller 300 does not lower the resolution of the pixel data to be written in the pixels of the focal region on the display panel 100 or increasing the resolution to transmit high-resolution data to the display driver 200. Here, the controller 300 may lower the resolution of the pixel data gradually or stepwise toward an outer region from a center portion in the focal region. The controller 300 reduces the data transmission amount and the number of transitions by significantly configured to lower the resolution of the non-focal region.

Due to intrinsic properties of the optic nerve, the user does not recognize a low-resolution image reproduced in the pixels of the non-focal region other than the focal region in the VR/AR system. A resolution compression range which the user is not able to recognize may be set as in FIG. 2 while reducing a transmitted data amount.

The focal region may be set to a size having a diameter of 2.8 mm when the distance between the pupil of the user and the screen AA is considered in the VR system. The focal region may be divided into N (N is a positive integer of 2 or more) levels toward the outside from the center. When the focal region is divided into three regions having different resolutions, if a pixel data resolution of a first region R1 corresponding to the center of the focal region is 100%, a pixel data resolution of a second region R2 outside the first region R1 may be reduced to 25% and a pixel data resolution of a third region R3 outside the second region R2 may be reduced to 11.1%. The resolution of the non-focal region NFR may be 6.2%. A diameter of the first region R1 may be set to 1.2 mm, a diameter of the second region R2 may be set to 1.9 mm, and a diameter of the third region R3 may be set to 2.8 mm, but are not limited thereto. In the VR system, the focal region may be approximately 2% of an entire screen AA.

The sensor 310 includes various sensors including a gyro sensor, an acceleration sensor, etc. The sensor 310 transmits outputs of various sensors to the controller 300. The controller 300 receives the output of the sensor 310 and synchronizes the received output with a movement of the user to move pixel data of an image displayed on the screen AA. Accordingly, the focal region synchronizes with the movements of the pupil and the head of the user, so a location of the focal region may be changed on the screen AA.

Figure 3:
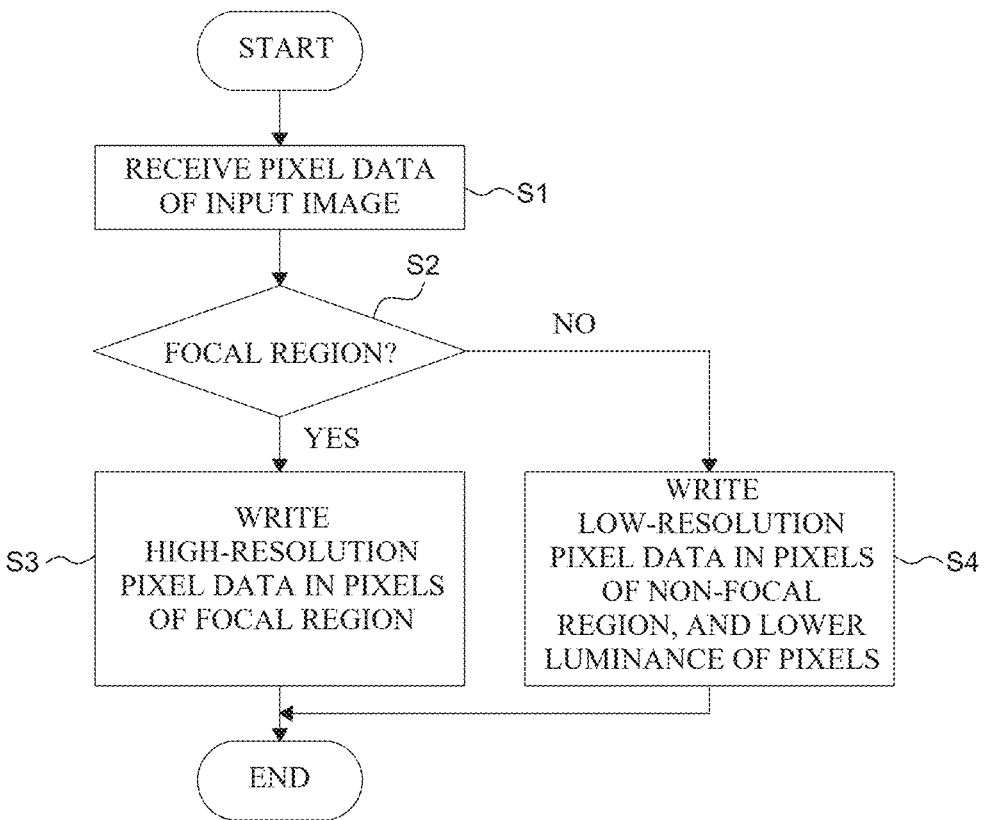
FIG. 3 is a flowchart showing an operation of a display driver according to an embodiment of the present disclosure.

FIG. 3 is a flowchart showing an operation of a display driver according to an embodiment of the present disclosure.

Referring to FIGS. 1 and 3, when the pixel data of the input image is received from the controller 300 through an interface reception circuit (S1), the display driver 200 writes the pixel data in the pixels of the display panel 100. The display driver 200 lowers luminance of the pixels written in the pixels of the non-focal region to reduce power consumption.

The display driver 200 writes high-resolution pixel data in the pixels of the focal region on the screen AA of the display panel 100 (S2 and S3). The resolution of the pixel data in the focal region may be lowered gradually or stepwise toward the outside from the center. On the contrary, the display driver 200 writes low-resolution pixel data in the pixels of the non-focal region outside the focal region, and lowers the luminance of the focal region compared to the luminance of the focal region (S2 and S4).

Figure 4A:
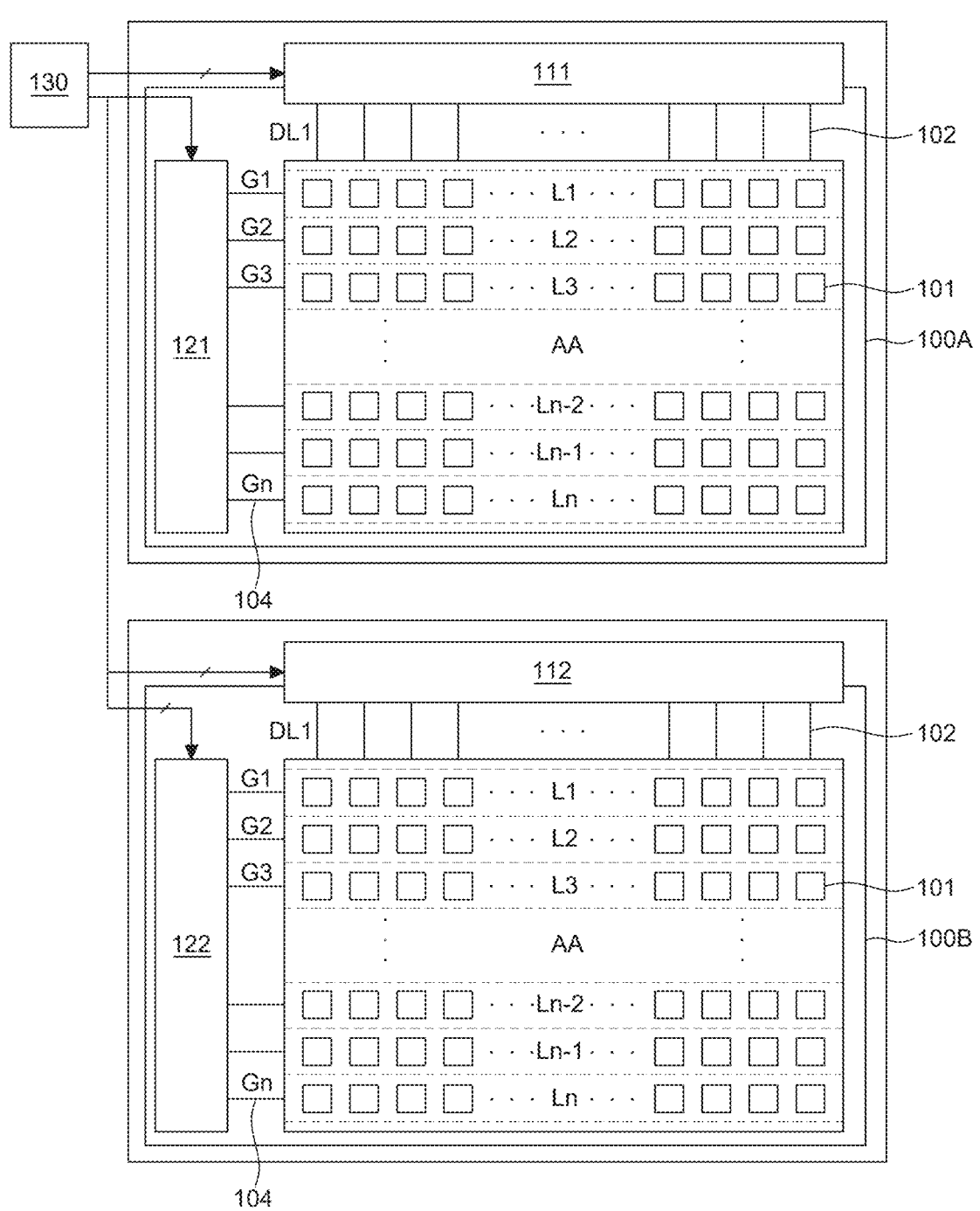
FIGS. 4A and 4B are diagrams specifically illustrating the display driver and a display panel illustrated in FIG. 1 according to an embodiment of the present disclosure.
Figure 4B:
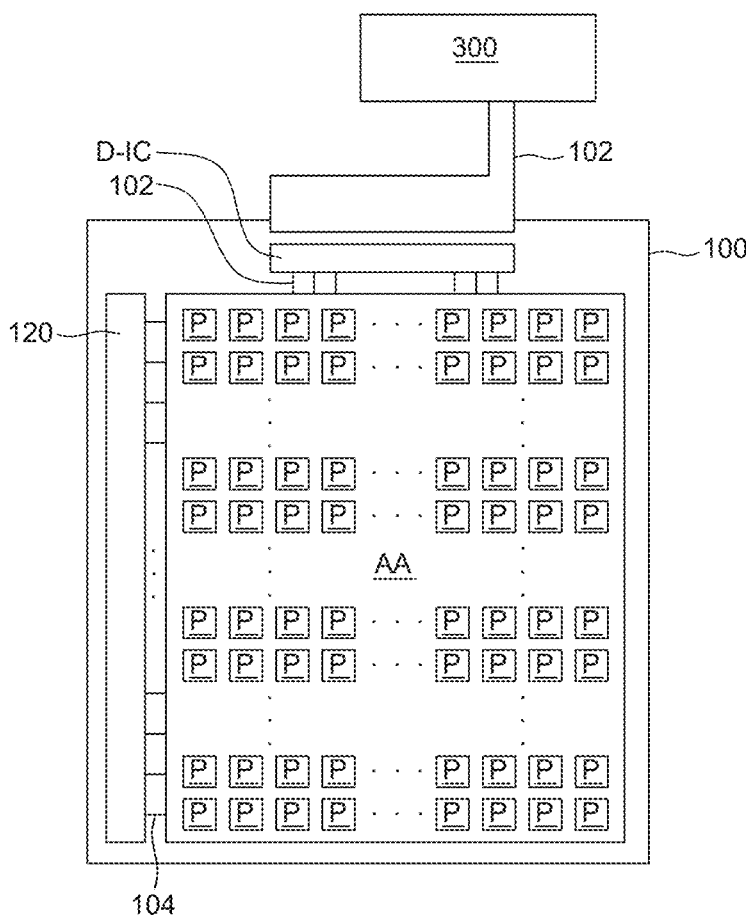

FIGS. 4A and 4B are diagrams specifically illustrating the display driver and a display panel illustrated in FIG. 1 according to an embodiment of the present disclosure.

Referring to FIG. 4A, the display apparatus according to the present disclosure includes a first display panel 100A, a second display panel 100B, and a display driver driving the first and second display panels 100A and 100B.

The first and second display panels 100A and 100B may be implemented as a display panel in which an image is displayed in a flat panel display device such as a liquid crystal display (LCD), an electroluminescence display, etc. The electroluminescence display may be distinguished as an inorganic light emitting display device and an organic light emitting display device according to a material of a light emitting layer. As an example, of the inorganic light emitting display device, there is a quantum dot display device. Hereinafter, as the display device, the organic light emitting display device will be primarily described, but the display device is not limited thereto.

The first display panel 100A may be a left-eye display panel, and the second display panel 100B may be a right-eye display panel, but are not limited thereto. In the case of a mobile terminal system such as a smartphone, both the left-eye image and the right-eye image may be displayed on the screen AA of one display panel 100 illustrated in FIG. 4B. In the case of the smartphone, as one example of a partial mode, a VR mode is supported. In the VR mode of the smartphone, the left-eye image and the right-eye image may be separated and jointly displayed on one display panel. In the mobile terminal system of the present disclosure, in the VR mode, the left-eye image and the right-eye image may be displayed on one display panel, and the luminance of the image displayed in the non-focal region outside the high-resolution focal region may be controlled to be lower than the luminance of the focal region in each of the left-eye image and the right-eye image.

Each of the display panels 100A and 100B includes data lines to which pixel data of an input image is applied, gate lines (or scan lines) to which a gate signal is applied, and pixels disposed in a matrix form by a cross structure of the data lines and the gate lines. An image is displayed in a pixel array on the screens AA of the display panels 100A and 100B.

Each of the pixels may be divided into subpixels 101 such as a red subpixel, a green subpixel, a blue subpixel, etc., for color implementation. Each of the pixels may further include a white subpixel. In the case of the organic light emitting display device, each of the subpixels 101 may include a pixel circuit illustrated in FIG. 5, but is not limited thereto.

In a personal immersive system such as the VR/AR system, a left-eye image in which the luminance of the non-focal region is lower than the luminance of the focal region may be displayed on the first display panel 100A. On the second display panel 100B, a right-eye image in which the luminance of the non-focal region is lower than the luminance of the focal region may be displayed.

In FIG. 4A, pixel lines L1, L2, . . . , Ln include one line of pixels in which pixel data are simultaneously written during a first horizontal period on the screens of the display panels 100A and 100B. When the resolution of the screen AA is m*n, the screen AA includes n pixel lines L1, L2, . .

. , Ln. In the display panel 100 of FIG. 4B, data are simultaneously written in pixels P of the pixel lines.

The display driver 200 writes data of the input image in the display panels 100A and 100B. The display driver 200 includes data drivers 111 and 112, gate drivers 121 and 122, a timing controller 130, and the like.

The first data driver 111 and the first gate driver 121 are connected to the first display panel 100A to drive the first display panel 100A under the control of the timing controller 130. The second data driver 112 and the second gate driver 122 are connected to the second display panel 100B to drive the second display panel 100B under the control of the timing controller 130.

In the case of the mobile terminal system, the data driver and the timing controller may be embedded in a drive IC (D-IC) as illustrated in FIG. 4B.

The data drivers 111 and 112 convert the pixel data from the timing controller 130 into a data voltage by using a gamma compensation voltage, and output the data voltage to the data lines 102. The data drivers 111 and 112 may convert black gray data B set apart from the pixel data of the input image under the control of the timing controller 130 into a black gray voltage by using the gamma compensation voltage, and output the black gray voltage to the data lines 102. Accordingly, the pixel data voltage or the black gray voltage may be applied to each of the subpixels 101 through the data lines 102.

The gate drivers 121 and 122 outputs a gate signal (or a scan signal) synchronized with the pixel data to the gate lines 104. The gate drivers 121 and 122 include a shift register for sequentially configured to supply the gate signal to the gate lines G1 to Gn by shifting a pulse of the gate signal.

The timing controller 130 transmits, to the data drivers 111 and 112, the pixel data of the input image received from the controller 300. The timing controller 130 may transmit black gray data to the data drivers 111 and 112 jointly with the pixel data. The timing controller 130 receives, from controller 300, timing signals synchronized with the pixel data of the input image, and controls operation timings of the data drivers 111 and 112 and the gate drivers 121 and 122 based on the timing signals.

The timing controller 130 may determine locations of the pixels in which the pixel data is written by counting the pixel data of the input image as a clock. The timing controller 130 transmits, to the data drivers 111 and 112, a control signal for controlling pixels luminance of the focal region and the non-focal region, and activates a control signal for configured to lower the pixel luminance to control the pixel luminance of the non-focal region to be low as compared with the focal region when the pixel data of the input image is data to be written in a pixel which belongs to the non-focal region.

In FIG. 4B, the driver IC (D-IC) may be electrically connected to the controller 300 through flexible printed circuits (FPC), and electrically connected to the data lines 102 and the gate driver 120 on the display panel 100. The drive IC (D-IC) includes the data driver and the timing controller. Accordingly, the driver IC (D-IC) converts the pixel data received from the controller 300 into a data voltage, and supplies the data voltage to the data lines 102, and controls the operation timing of the gate driver 120. The drive IC generates a control signal for configured to lower the luminance of the pixels P of the non-focal region, and lowers the luminance of the pixels P in the non-focal region in response to the control signal.

In the mobile terminal system such as the smartphone, a left-eye image in which the luminance of the non-focal region is lower than that of the focal region, and a right-eye image in which the luminance of the non-focal region is lower than that of the focal region may be displayed on one display panel 100.

Each of the subpixels 101 includes a pixel circuit for driving the light emitting element (OLED).

Figure 5A:
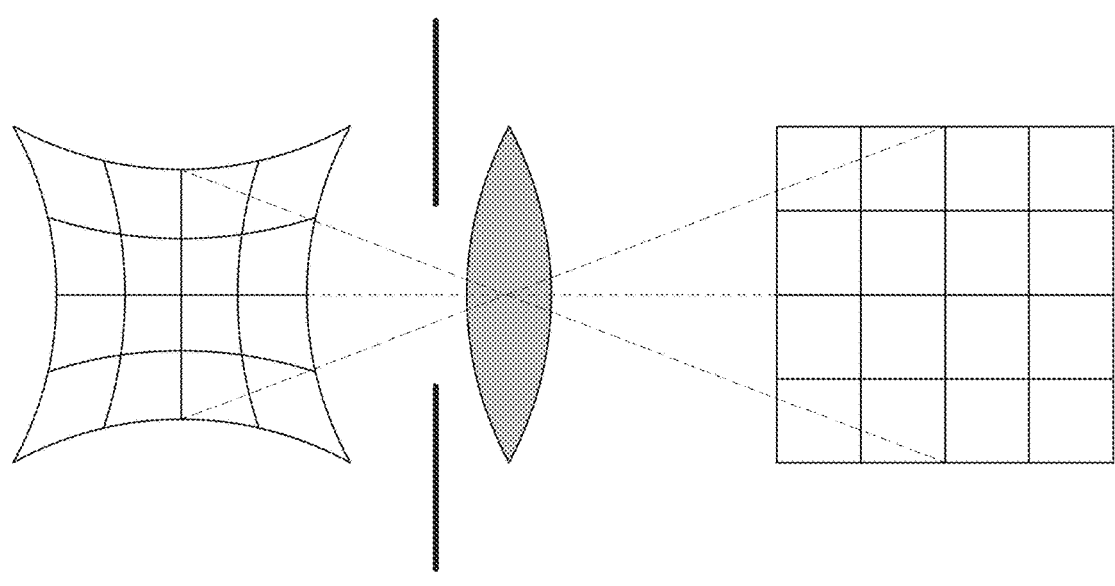
FIGS. 5A and 5B are diagrams illustrating pincushion distortion by an optical system according to an embodiment of the present disclosure.
Figure 5B:
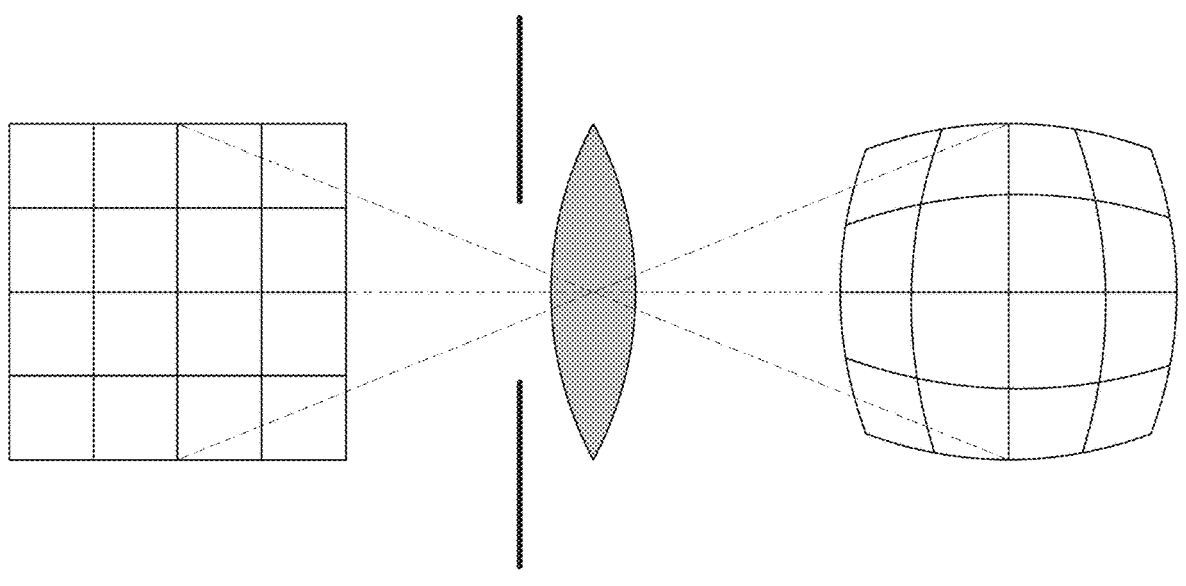

FIGS. 5A and 5B are diagrams illustrating pincushion distortion by an optical system according to an embodiment of the present disclosure.

Referring to FIG. 5A, pincushion distortion may occur by a lens in an image which a person views with naked eyes. More specifically, the pincushion distortion occurs in a screen image by an optical system (e.g., the lens) used in the virtual reality (VR) device, and the user views an actual image in a distorted state.

Referring to FIG. 5B, a screen image may be configured so that the pincushion distortion does not occur in the image which the person views with naked eyes. More specifically, a degree to be changed by the pincushion distortion may be computed in advance, and pre-reflected onto the screen image. When the screen image onto which a computation value is pre-reflected goes through the optical system, an image with no distortion, which is to be shown to the user may be recognized with naked eyes through the VR device. For reference, the distortion pre-reflected onto the screen image by considering the pincushion distortion is referred to as barrel distortion. For example, the controller may apply a pre-reflected distortion (e.g., the barrel distortion) into the screen image to be displayed by the display panel so as to compensate the distortion (e.g., the pincushion distortion) of the lens.

Figure 6:
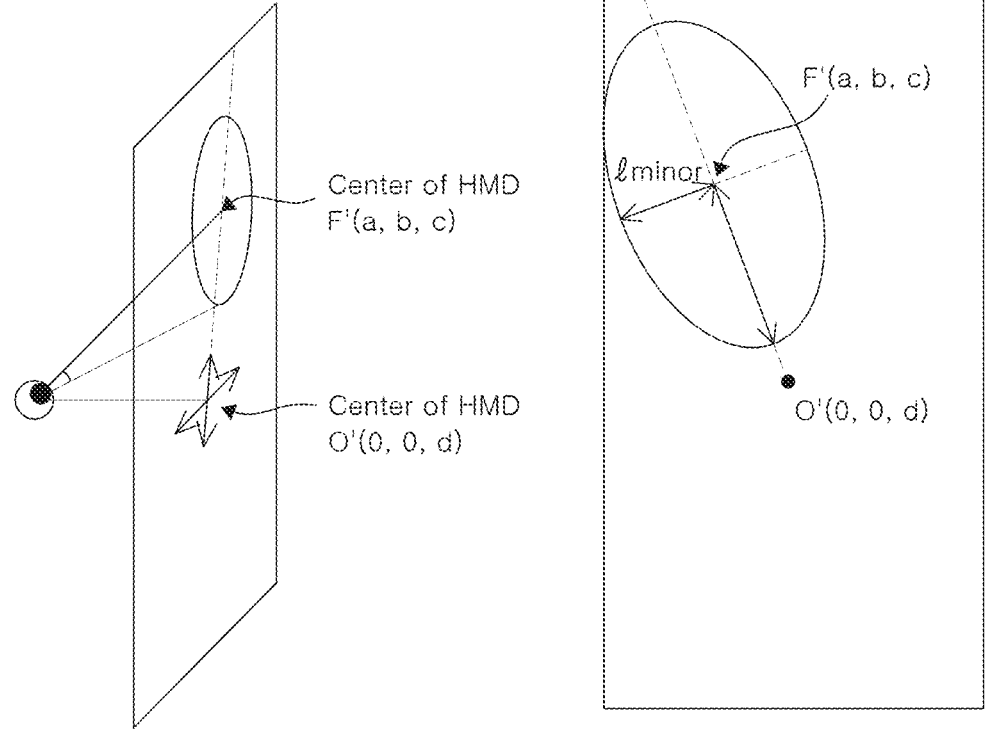
FIG. 6 is a diagram illustrating a shape of a focal region changed according to a focal location when viewed with naked eyes according to an embodiment of the present disclosure.

FIG. 6 is a diagram illustrating a shape of a focal area changed according to a focal location when viewed with naked eyes according to an embodiment of the present disclosure.

Referring to FIG. 6, a viewing field which the person is capable of recognizing is a spherical form with naked eyes. Specifically, the viewing field of the person which is a substantial spherical form may have a horizontal viewing angle of approximately 180 degrees and a vertical viewing angle of approximately 120 degrees. This means a visual range which the persons may view without moving the head. The lens and retina of the eye converts a 3D image into a 2D image, and transfers the 2D image to the brain.

Typically, a screen image by the display device viewed by the person is expressed on a 2D plane. A screen image of the 2D plane is positioned at the same distance in all directions unlike an actual 3D world. Thus, as the user is far away from the center of the screen image, that is, as a neighboring viewing field is used, the screen image is recognized differently in the eyes. The reason is the distortion which occurs when a plane image is projected to a spherical viewing field.

When the plane image is projected to a spherical surface, a center portion may be distorted relatively less, but the image is extended or distorted toward the edge. In particular, the distortion may be more prominent when a peripheral portion of the image is viewed. When the plane image is projected to the spherical viewing field, an edge portion of the image may be distorted in an oval. This is caused due to the instinct of person's eyes to recognize a 3D space even though the plane image does not have a spatial depth.

Such a phenomenon plays an important role in processing visual information. For example, in the virtual reality or augmented reality technology, it is necessary to minimize visual distortion, and provide a more natural visual experience.

Figure 7:
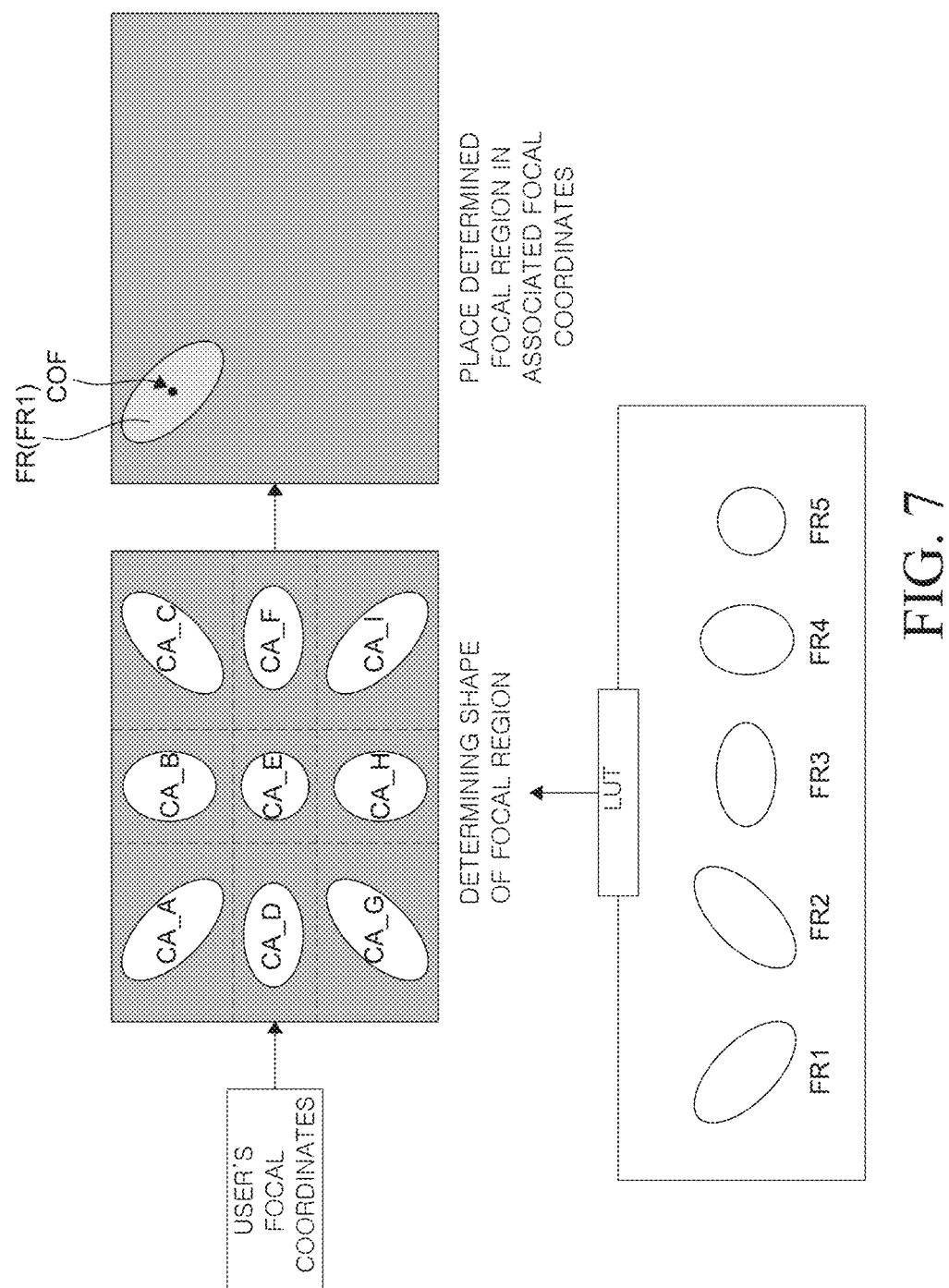
FIG. 7 is a diagram for explaining a method for computing a focal region according to an embodiment of the present disclosure.
Figure 8:
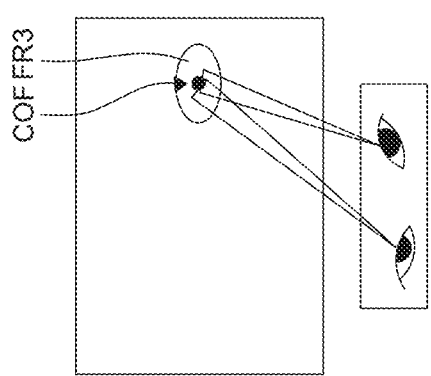
FIG. 8 illustrates a computation example of the focal region according to the method of FIG. 7 according to an embodiment of the present disclosure.
Figure 8:
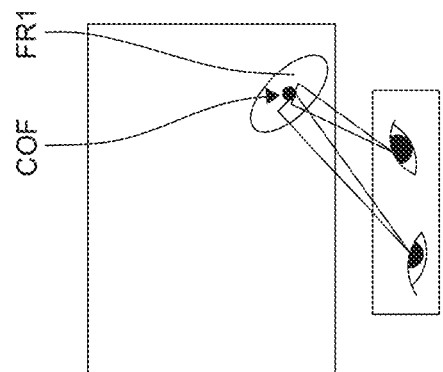
Figure 8:
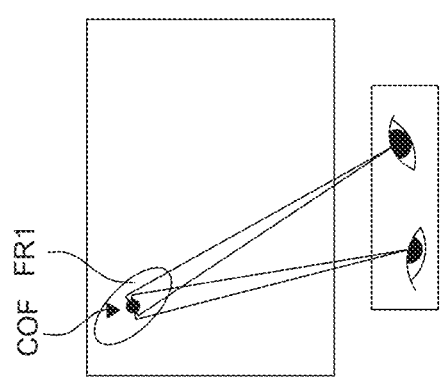
Figure 8:
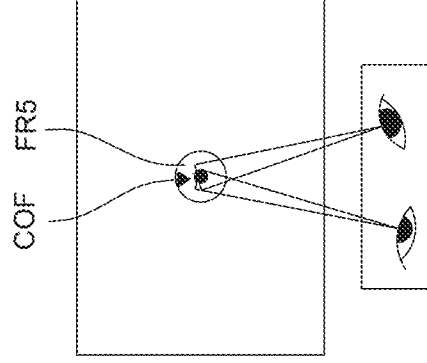
Figure 8:
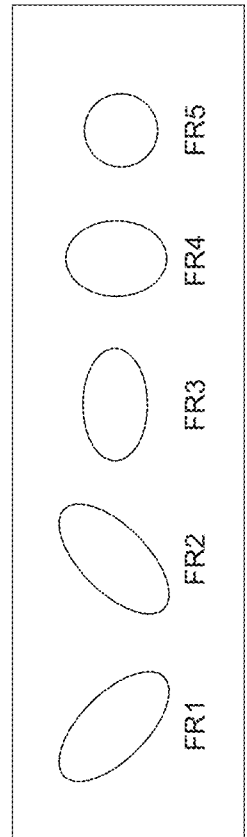
Figure 9:
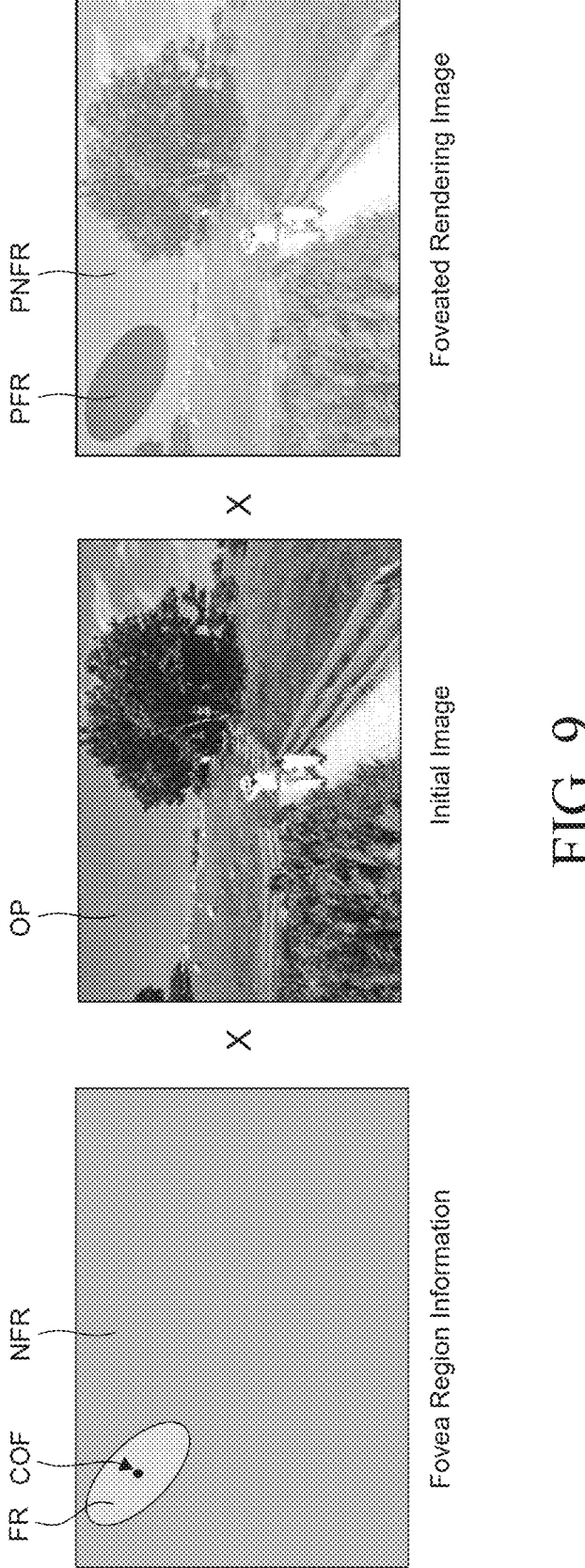
FIG. 9 illustrates an example of configured to distinguish and configured to display the focal region and a neighboring region according to the method of FIG. 7 according to an embodiment of the present disclosure.

FIG. 7 is a diagram for explaining a method for computing a focal region according to an embodiment of the present disclosure, FIG. 8 illustrates a computation example of the focal region according to the method of FIG. 7 according to an embodiment of the present disclosure. FIG. 9 illustrates an example of configured to distinguish and configured to display the focal region and a neighboring region according to the method of FIG. 7 according to an embodiment of the present disclosure.

Referring to FIG. 7, the display apparatus may recognize a focal location COF of the user. A controller (the controller 300 of FIG. 1) transmits image data to a display driver (the display driver 200 of FIG. 1). The controller 300 analyzes the image data from a camera (the camera 320 of FIG. 1) that captures a left eye and a right eye of a user with a predetermined eye tracking algorithm to estimate a focal region FR and/or a focal location COF faced by the gaze of the user. The focal location COF may be expressed by a 2D or 3D coordinate system, and in the present disclosure, the focal location COF may be interchangeably used with focal coordinates.

The controller 300 may determine a shape of the focal region FR based on the focal location COF. The shape of the focal region (FR) may include a circle or an oval. The focal shape of the oval may include a first focal shape FR1 and a second focal shape FR2 having a long axis in a diagonal direction, a third focal shape FR3 having a long axis in a horizontal direction, and/or a fourth focal shape FR4 having a long axis in a vertical direction. The first focal shape FR1 and the second focal shape FR2 may have long axes inclined in different directions.

The shapes of the focal regions FR may be associated with the focal location COF determined by the controller 300. The controller 300 may determine a shape of the focal region (FR) based on the focal location (COF). The screen may be blocked with a plurality of blocks constituting M×N matrix (M and N are natural numbers). Any one of the plurality of blocks may be determined as an interested block based on the focal location COF.

According to an embodiment of the present disclosure, the controller 300 may identify which blocks among the plurality of blocks the focal location COF according to the user's gaze is positioned at. The focal location COF may be positioned in any one of first to ninth blocks CA_A, . . . , CA_I, for example, and the controller 300 may determine any one of the first to ninth blocks CA_A, . . . , CA_I as the focal location COF. At this time, the block in which the focal location COF is identified may be determined as the interested block. More specifically, the controller 300 may determine the interested block in which the focal location COF is identified among the plurality of blocks, and obtain interested block information corresponding to the interested block. The interested block information may be an identifier for configured to distinguish which block, among the plurality of blocks, in which the focal location COF is identified is.

The shape of the focal region FR corresponding to the interested block information may be preset in the form of a look up table (LTU). For example, a screen configured in 3×3 matrix may include first to ninth blocks CA_I, and the shape of the focal region FR when each of the first to ninth blocks CA_I is the interested block may be stored as the look up table.

The controller 300 may determine the shape of the focal region FR based on the interested block information and the look up table when the focal location COF is identified. Referring to FIGS. 7 and 8, when it is determined that the focal location COF is positioned in a first block CA_A, the controller 300 may determine the shape of the focal region FR as a first focal shape FR1. When it is determined that the focal location COF is positioned in a second block CA_B, the controller 300 may determine the shape of the focal region FR as a fourth focal shape FR4. When it is determined that the focal location COF is positioned in a third block CA_C, the controller 300 may determine the shape of the focal region FR as a second focal shape FR2. When it is determined that the focal location COF is positioned in a fourth block CA_D, the controller 300 may determine the shape of the focal region FR as a third focal shape FR3. When it is determined that the focal location COF is positioned in a fifth block CA_E, the controller 300 may determine the shape of the focal region FR as a fifth focal shape FR5. When it is determined that the focal location COF is positioned in a sixth block CA_F, the controller 300 may determine the shape of the focal region FR as a third focal shape FR3. When it is determined that the focal location COF is positioned in a seventh block CA_G, the controller 300 may determine the shape of the focal region FR as a second focal shape FR2. When it is determined that the focal location COF is positioned in an eighth block CA_H, the controller 300 may determine the shape of the focal region FR as a fourth focal shape FR4. When it is determined that the focal location COF is positioned in a ninth block CA_I, the controller 300 may determine the shape of the focal region FR as a first focal shape FR1. It is to be noted that the shape of the focal region depending on the focal location shown in FIG. 7 is provided by way of example only, and the present disclosure is not limited thereto. For example, when the shape or structure of the screen of the display panel varies, the shape of the focal region depending on the focal location may be different from that shown in FIG. 7.

Meanwhile, according to an embodiment of the present disclosure, the look up table may be set manually by the user, or automatically set based on a distance between an eyeball and the panel, and optical system information. The distance between the eyeball and the panel may be measured by the camera or a separately provided distance meter. The optical system information may include an optical system configuration and/or information on a lens type. The controller 300 may configure a look up table personalized for each user by using at least one of the distance between the eyeball and the panel, and/or the optical system information. Further, the controller 300 may update the look up table based on new introduced optical system information when the optical system (e.g., at least one of an optical system component and/or the lens) constituting the display device is changed.

According to an embodiment of the present disclosure, when the shape of the focal region FR is determined, the controller 300 may place the determined focal region FR around an associated focal location. The focal region FR may be configured in the circle or oval, and each focal region FR may have one center point. The focal region FR may be disposed by considering the focal location which becomes a basis of determining the shape of the focal region FR as the center point.

As such, as the focal region FR is disposed at a specific location (the focal location COF), fovea region information may be generated. The fovea region information may include the focal location COF and the focal region FR disposed around the focal location COF, and a neighboring region NFR positioned neighboring to the focal region FR.

Referring to FIGS. 7 and 9, the controller 300 may form a foveated rendering image by applying the fovea region information to an original image OP. For example, the controller 300 may form the foveated rendering image by multiplying the original image OP by the fovea region information. The foveated rendering image may include a focus processing region PFR corresponding to the focal region FR and a neighboring focus processing region PNFR corresponding to the neighboring region NFR. Resolutions of the focus processing region PFR and the neighboring focus processing region PNFR may be set differently from each other.

In detail, the controller 300 controls resolutions of the input image in the focal region, a neighboring region adjacent to the focal region, and an outside region outside the neighboring region by using a foveated rendering algorithm. For example, the focal region is a region in which the image is expressed with a first resolution and the neighboring region is a region in which the image is expressed with a second resolution lower than the first resolution. The outside region may be a region in which the image is expressed with a third resolution lower than the second resolution. The outside region may be a display region with the second resolution similarly to the neighboring region.

According to an embodiment of the present disclosure, the display driver 200 may include a data driver that lowers the resolution of input image data to be written in subpixels of the neighboring region compared to the focal region FR, and converts the input image data into a data signal and supplies the data signal to the data lines of the display panel. Additionally, the display driver 200 may set a driving frame frequency of the display panel to a frequency equal to or higher than an input frame frequency of the image data received from the controller 300, and lower the number of shifts of the gate signal applied to the gate lines in the neighboring region compared to the focal region FR. For example, the driving frame frequency for the neighboring region is lower than the driving frame frequency for the focal region.

The embodiments of the present disclosure can also be described as follows:

In order to achieve the problem, a display device according to an embodiment of the present disclosure may include: a display panel; a controller configured to estimate a focal region faced by a user's gaze, and configured to process a resolution of input image data in a neighboring region neighboring to the focal region to be lower than a resolution of the focal region; and a display driver configured to distinguish the focal region and the neighboring region on a screen of the display panel, and a shape of the focal region may be varied according to a focal location corresponding to the user's gaze.

The screen may include a plurality of blocks constituting M×N matrix (M and N are natural numbers), the shape of the focal region may be determined based on interested block information, and the interested block information may be an identifier indicating a block in which the focal location may be identified among the plurality of blocks.

The shape of the focal region corresponding to the interested block information may be preset in the form of a look up table.

The display driver may include a data driver configured to lower the resolution of input image data to be written in subpixels of the neighboring region compared to the focal region, and configured to convert the input image data into a data signal and supplies the data signal to data lines of the display panel, and a gate driver configured to supply the gate signal to gate lines of the display panel.

The display driver may set a driving frame frequency of the display panel to a frequency equal to or higher than an input frame frequency of the image data received from the controller, and lowers the number of shifts of the gate signal applied to the gate lines in the neighboring region compared to the focal region.

A display device according to an embodiment of the present disclosure may include: a display panel configured to display an image; an optical lens configured to distort the image and transferring the image to naked eyes of a user; a controller configured to determine a shape of a focal region based on a focal location of the user; and a memory including a look up table storing shapes of a plurality of predetermined focal regions to correspond to different focal locations, and the controller may be configured to select a shape of a predetermined focal region of the plurality of predetermined focal regions from the look up table based on the focal location of the user.

The display device may further comprise a camera configured to detect the focal location of the user, and provide focal location data for the focal location to the controller.

The controller may be configured to approach the look up table in order to search a shape of a focal region corresponding to the focal location in response to providing the focal location data.

The controller may be configured to form a foveated rendering image by applying the searched shape of the focal region based on the look up table to an original image, and output the foveated rendering image through the display panel.

What is claimed is:

1. A display device, comprising:
a display panel;
a controller configured to:
    estimate a focal region faced by a user's gaze, and
    process a resolution of input image data in a neighboring region neighboring to the focal region to be less than a resolution of the focal region; and
a display driver configured to distinguish the focal region and the neighboring region on a screen of the display panel,
wherein a shape of the focal region is varied according to a focal location corresponding to the user's gaze, and
wherein the display driver comprises:
    a data driver configured to:
        lower the resolution of input image data to be written in subpixels of the neighboring region compared to the focal region,
        convert the input image data into a data signal, and supply the data signal to data lines of the display panel; and
    a gate driver configured to supply a gate signal to gate lines of the display panel.

2. The display device of claim 1, wherein:
the screen includes a plurality of blocks constituting an M×N matrix, M and N being natural numbers; and
a shape of the focal region is determined based on interested block information, the interested block information being an identifier indicating a block in which the focal location is identified among the plurality of blocks.

3. The display device of claim 2, wherein the shape of the focal region corresponding to the interested block information is preset in a form of a look up table.

4. The display device of claim 1, wherein the display driver is further configured to:

set a driving frame frequency of the display panel to a frequency equal to or higher than an input frame frequency of the input image data received from the controller; and lower a number of shifts of a gate signal applied to gate lines in the neighboring region compared to the focal region.

5. The display device of claim 1, wherein the focal region is determined by considering the focal location as a center point of the focal region.

6. The display device of claim 1, wherein a luminance of the neighboring region is lower than that of the focal region.

7. A display device, comprising:

a display panel configured to display an image;

a controller configured to determine a shape of a focal region based on a focal location of a user; and a memory including a look up table that stores shapes of a plurality of predetermined focal regions to correspond to different focal locations, wherein the controller is further configured to select a shape of a predetermined focal region of the plurality of predetermined focal regions from the look up table based on the focal location of the user, and wherein the look up table is set manually by the user, or the look up table is automatically set based on a distance between naked eyes of the user and the display panel and optical system information of an optical lens of the display device.

8. The display device of claim 7, further comprising:

a camera configured to detect the focal location of the user and provide focal location data for the detected focal location to the controller.

9. The display device of claim 8, wherein the controller is further configured to:

in response to receiving the focal location data, approach the look up table in order to search for a shape of a focal region corresponding to the focal location.

10. The display device of claim 9, wherein the controller is further configured to:

form a foveated rendering image by applying the searched shape of the focal region based on the look up table to an original image; and output the foveated rendering image through the display panel.

11. The display device of claim 7, wherein the controller is configured to apply a pre-reflected distortion into the image to be displayed by the display panel.

12. The display device of claim 11, wherein the pre-reflected distortion is a barrel distortion.

* * * * *